United States Patent [19]

Lenderking

[11] 4,402,903
[45] Sep. 6, 1983

[54] CONTROL SYSTEM FOR COUPLING REDUNDANT LOGIC CHANNELS

[75] Inventor: Bruce N. Lenderking, Glen Burnie, Md.

[73] Assignee: Westinghouse Electric Corp., Pittsburgh, Pa.

[21] Appl. No.: 299,458

[22] Filed: Sep. 4, 1981

[51] Int. Cl.³ ............................................. G21C 7/00
[52] U.S. Cl. .................................. 376/245; 376/259; 455/616; 340/508
[58] Field of Search .............................. 455/616, 602; 250/211 J; 176/19 R, 19 EC, 23, 24; 340/177, 189 R, 190, 201 R, 201 P, 501, 508; 376/245, 259

[56] References Cited

U.S. PATENT DOCUMENTS

| | | |
|---|---|---|
| 3,027,806 | 4/1962 | Koelsch, Jr. . |
| 3,069,973 | 12/1962 | Ames . |
| 3,531,179 | 9/1970 | Jaffe et al. . |
| 3,679,974 | 7/1972 | Mollenbeck ........................ 455/616 |
| 3,888,772 | 6/1975 | Neuner ................................ 455/602 |
| 4,002,896 | 1/1977 | Davies et al. ...................... 455/616 |
| 4,145,607 | 3/1979 | Bates .................................. 455/616 |

Primary Examiner—Jin F. Ng
Assistant Examiner—Edward L. Coles
Attorney, Agent, or Firm—W. G. Sutcliff

[57] ABSTRACT

A control system for coupling redundant logic channels while maintaining electrical and physical isolation between channels. The separate redundant logic channels each include an electro-optic modulator, which are connected by fiber optic links, with system condition sensors generating signals which are applied to the electro-optic modulators to control the light transmission characteristics of the electro-optic medium in response to a predetermined system condition. A light source is connected by input fiber optics to the logic channels, and output fiber optics connect the logic channels to a light detector.

2 Claims, 2 Drawing Figures

CONTROL SYSTEM FOR COUPLING REDUNDANT LOGIC CHANNELS

BACKGROUND OF THE INVENTION

The present invention relates to control systems which operate with redundant logic channels, and more particularly where these redundant channels are to be physically and electrically independent. Such redundant control systems are employed in nuclear power plants as safety control systems for continued safe operation.

It has been the practice to use photoelectric devices to maintain the physical and electrical insulation between the redundant channels, as is taught by U.S. Pat. No. 3,888,772, owned by the assignee of the present invention. Earlier systems interconnected the separate logic channels with either relays or transformers to provide the isolation.

Electro-optical devices are well known in which a birefringent crystal is modulated by an applied electric field to vary the light transmission characteristic of the crystal. These devices have been used as electrically controlled switches as described in representative U.S. Pat. Nos. 3,069,973; 3,027,806; and 3,531,179.

SUMMARY OF THE INVENTION

The present invention utilizes a plurality of electro-optical modulators as coupling means for redundant logic channels while maintaining physical and electrical independence of the logic channels. Fiber optic cable linking means are provided between a system light source and detector, and the plurality of optical logic units which include the electro-optic modulators. Separate operating system sensors are connected to the respective optical logic units and provide operating system condition or parameter indicative signals, which provide the modulation signal for the electro-optic modulators, and to thereby control the light transmission characteristics of these modulators.

In the particular embodiment the light intensity passed by the separate electro-optical modulatable member of the separate optical logic units is varied and controlled as a function of the operating system sensor generated signals. These sensors generate signals as a function predetermined system operating condition, and the signal is applied to modulate the light transmissivity through the separate redundant logic channels.

DESCRIPTION OF THE PREFERRED EMBODIMENT

Figure 1:
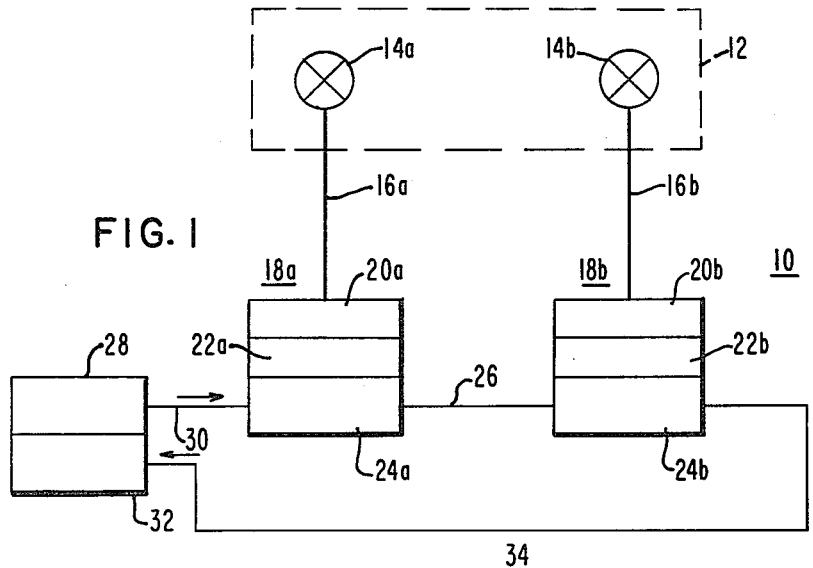
FIG. 1 is a schematic representative of the control system of the present invention for a two channel redundant logic system.

The control system of the present invention can be best understood by reference to the exemplary embodiments seen in the drawings. In FIG. 1, the control system 10 is associated with a nuclear power plant steam supply system 12 represented by the dotted line block. A plurality of sensors 14a and 14b are disposed within the nuclear power plant steam supply system 12. The sensors 14a and 14b are redundant sensors for a specific reactor parameter, such as radiation level, coolant temperature, steam generator pressure, with the appropriate sensor for the parameter to be measured. Thus, sensors 14a and 14b would be radiation detectors for neutron or gamma radiation measurement. An electrical instrumentation cable 16a and 16b is connected between respective sensors and the control system 10.

The control system 10 in the FIG. 1 embodiment includes two identical redundant channel means 18a and 18b, which each comprise a signal processing means 20a, 20b connected via cable 16a, 16b to the respective sensor 14a or 14b. The channel means 18a and 18b each includes an optical logic unit interface 22a and 22b and an optical logic unit 24a, 24b. The optical logic units 24a and 24b are connected by a fiber optic cable link 26.

The control system 10 includes a light source 28 which is inputed by fiber optic cable 30 to optical logic unit 24a. A light detector means 32 is connected to the output of optic logic unit 24b via fiber optic cable 34. The light source 28 and detector means 32 are connected to permit signal synchronization and provision of a reference signal for the detected light.

Figure 2:
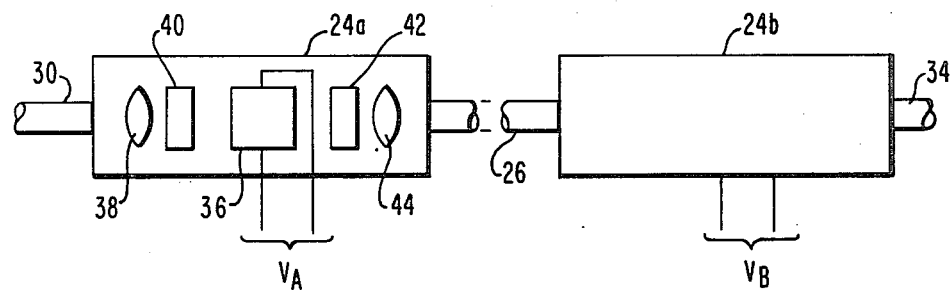
FIG. 2 is a representation showing greater detail of the optical logic unit portions of the FIG. 1 showing.

The optical logic unit 24a, 24b, as seen in greater detail in FIG. 2, comprise electro-optic modulatable member 36 which is illustrated as an elongated member with its optical axis aligned with the input cable 30, cable link 26, and output cable 34. The electro-optic modulatable member 36 is formed of a selected light transmissive material which has the property that an applied electric potential orthogonal to the optical transmissive axis is effective to modulate the light beam as it passes through the member 26.

For a member 36 which modulates light intensity, an input lens 38 and polarizer 40 are aligned along the optic axis between cable 30 and member 36, with output polarizer 42 and lens 44 aligned along this same axis between member 36 and cable 26. A potential $V_A$ is applied across member 36 establishing an electric field orthogonal to the light transmission axis as is well known to modulate the intensity of light passing through member 36.

The input polarizer 40 has its polarization axis at an angle of 45 degrees with respect to the slow transmission axis of the member 36. The fast transmissive axis of member 36 is aligned with the optical axis through lens 38 and 42 as well as polarizer 40 and 42. The slow transmissive axis is orthogonal to the first transmissive axis. Light from input polarizer 40 is linearly polarizer. The polarization axis of the output polarizer 42 is offset 90° from that of the input polarizer 40.

The modulating potential $V_A$ applied across electro-optic modulatable member 36 causes a phase differential for the linearly polarized light passing through member 36 varying from 0 to $\pi$ radians. This causes the polarization of the light to change from linear at 0 radians, to circular at $\pi/2$ radians, to linear normal relative to the input polarizer at $\pi$ radians. Thus, the intensity of light passing through the output polarizer, which has its polarization axis 90° offset from that of the input polarizer, varies from 0 to 100% of the input intensity as the phase varies from 0 to $\pi$ radians. The relationship of input and output light intensity for the system is defined by the equation:

$$(I_o/I_i) = \tfrac{1}{2}(1 - \cos \phi)$$

where $I_o$ is the output intensity, $I_i$ is input intensity, and $\phi$ is the differential phase shift between the fast and slow transmission axis for the system. The ratio of $I_o$ to $I_i$ is thus 0 at 0 radians for $\phi$, is 0.5 at $\pi/2$ radians, and is 1 for $\pi$ radians.

The second optical logic unit 24b is essentially identical to unit 24a with the fiber optic cable link 26 serially connecting them along a common optical axis. This fiber optic cable link 26 serves to couple the redundant logic channels and maintain physical and electrical isolation between the units.

The logic table below helps to explain operation of the system.

LOGIC TABLE

| $V_A$ | $V_B$ | Intensity |
|---|---|---|
| 0 | 0 | $\frac{1}{4}$ |
| 0 | 1 | $\frac{1}{2}$ |
| 1 | 0 | $\frac{1}{2}$ |
| 1 | 1 | 1 |

The light intensity which the detector senses is the product of the light output intensities of the optical logic units 24a, 24b. The modulating potentials $V_A$ and $V_B$ are applied respectively to units 24a, 24b, and are a function of the respective sensor 14a, 14b condition. The logic table shows that when $V_A$ is 0, and $V_B$ is 0, the light intensity sensed by detector 32 is $\frac{1}{4}$ of the light input intensity from light source 28. This results from the fact that when $V_A$ is 0, the output intensity from unit 24a is $\frac{1}{2}$, and since this is the light input for unit 24b, when $V_B$ is also 0, the output intensity from unit 24b is $\frac{1}{2} \times \frac{1}{2} = \frac{1}{4}$. When either $V_A$ or $V_B$ is 0, and the other is 1, the intensity at the detector will be $\frac{1}{2}$. Only when the values of $V_A$ and $V_B$ are each 1 will the intensity be 1. These values can be used to denote power plant conditions. Thus, when sensor 14a, 14b are reading normal operating conditions the potentials $V_A$ and $V_B$ could both be 1, and the intensity value 1 will indicate normal operating condition. When either of the sensors 14a or 14b provides a signal which is translated to a value of $V_A$, $V_B$ which is different from that of the other sensor this implies a fault in the system. The fault is a warning to check the sensor or compare other parameters to determine if the power plant is in fact operating normally or whether an operating parameter is outside of normal operating tolerances as to require operator correction or intervention. The intensity level of $\frac{1}{4}$ which is had when the sensor 14a, 14b both indicate the same parameter condition, and with potentials $V_A$ and $V_B$ of 0 applied to the optical logic units would indicate a definite out of tolerance system parameter and result in an automatic trip or shutdown control signal being generated. When these redundant channels both indicate the same condition the control system is actuated to provide continued safe operator control.

The system described is a two channel system but can easily be expanded to the more commonly used three channel system used in many nuclear power plant control systems.

I claim:

1. In a nuclear reactor electrical control system wherein redundant logic channels are maintained electrically isolated and physically separated with a serial fiber optic light transmissive link between the logic channels, and a plurality of independent reactor condition sensor means are electrically connected to respective electro-optic channel coupling means which are coupled to respective logic channels, which electro-optic channel coupling means includes an electro-optic channel coupling means includes an electro-optical modulatable medium the light transmission characteristic of which is variable in response to reactor condition electrical signals from the respective sensor means, and wherein fiber optic input and output cables connect the channel coupling means to a light input source and a light output detector means from which a reactor control signal is generated in response to predetermined reactor system conditions as indicated by the sensor means, and wherein when all of the plural sensor means generate equal signals of a value indicative of normal reactor operating condition the light transmission to the detector means is maximized, and wherein when the plural sensor means generate unequal signals which result is reduced light transmission to the detector means this is indicative of a possible out of tolerance reactor condition, and wherein when all of the plural sensor means generate an equal signal of a value which is indicative of an out of tolerance reactor condition the light transmission to the detector means is reduced to a value indicating a confirmed by plural sensor means out of tolerance reactor condition.

2. The control system set forth in claim 1, wherein the electro-optic channel coupling means includes an elongated member of electro-optic modulated medium with its light transmission axis aligned along a common optical axis with the fiber optic input and output cables and the fiber optic link between the logic channels, and wherein an input polarizer is aligned along this optical axis at the input end of the elongated member at which input polarizer has its polarization axis at a predetermined angle to the light transmission axis of the elongated member, and an output polarizer is aligned along the optical axis at the output end of the elongated member which output polarizer has its polarization axis offset 90 degrees from that of the input polarizer, and wherein the reactor condition electrical signal from the respective sensor means is applied across the respective elongated member orthogonal to the light transmission axis.

* * * * *